United States Patent
Ker et al.

(10) Patent No.: US 10,087,267 B2
(45) Date of Patent: Oct. 2, 2018

(54) METHOD FOR ALTERING MELT FLOW RATIO OF ETHYLENE POLYMERS

(71) Applicant: NOVA Chemicals (International) S.A., Fribourg (CH)

(72) Inventors: Victoria Ker, Calgary (CA); Peter Phung Minh Hoang, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 125 days.

(21) Appl. No.: 15/235,162

(22) Filed: Aug. 12, 2016

(65) Prior Publication Data

US 2017/0051091 A1    Feb. 23, 2017

(30) Foreign Application Priority Data

Aug. 20, 2015   (CA) .................................... 2900772

(51) Int. Cl.
*C08F 210/14*   (2006.01)
*C08F 210/16*   (2006.01)

(52) U.S. Cl.
CPC .......... *C08F 210/14* (2013.01); *C08F 210/16* (2013.01); *C08F 2410/01* (2013.01); *C08F 2410/02* (2013.01)

(58) Field of Classification Search
None
See application file for complete search history.

(56) References Cited

U.S. PATENT DOCUMENTS

| | | |
|---|---|---|
| 3,248,179 A | 4/1966 | Norwood |
| 4,302,566 A | 11/1981 | Karol et al. |
| 4,325,849 A | 4/1982 | Rosen et al. |
| 4,543,399 A | 9/1985 | Jenkins, III et al. |
| 4,588,790 A | 5/1986 | Jenkins, III et al. |
| 4,613,484 A | 9/1986 | Ayres et al. |
| 4,719,193 A | 1/1988 | Levine et al. |
| 5,026,795 A | 6/1991 | Hogan |
| 5,028,670 A | 7/1991 | Chinh et al. |
| RE33,683 E | 9/1991 | Allen et al. |
| 5,317,036 A | 5/1994 | Brady, III et al. |
| 5,352,749 A | 10/1994 | DeChellis et al. |
| 5,405,922 A | 4/1995 | DeChellis et al. |
| 5,433,471 A | 7/1995 | Shepherd et al. |
| 5,436,304 A | 7/1995 | Griffin et al. |
| 5,462,999 A | 10/1995 | Griffin et al. |
| 5,504,166 A | 4/1996 | Buchelli et al. |
| 5,616,661 A | 4/1997 | Eisinger et al. |
| 5,668,228 A | 9/1997 | Chinh et al. |
| 5,684,097 A | 11/1997 | Palmroos et al. |
| 5,712,352 A | 1/1998 | Brant et al. |
| 5,763,543 A | 6/1998 | Muhle et al. |
| 6,114,479 A | 9/2000 | Speca et al. |
| 6,117,955 A | 9/2000 | Agapiou et al. |
| 6,124,230 A | 9/2000 | Speca et al. |
| 6,140,264 A | 10/2000 | Kelly et al. |
| 6,140,432 A | 10/2000 | Agapiou et al. |
| 6,180,729 B1 | 1/2001 | Lange et al. |
| 6,180,736 B1 | 1/2001 | Muhle et al. |
| 6,201,076 B1 | 3/2001 | Etherton et al. |
| 6,476,165 B1 | 11/2002 | Wang |
| 6,977,283 B1 | 12/2005 | Shutt et al. |
| 7,211,535 B2 | 5/2007 | Kelly et al. |

FOREIGN PATENT DOCUMENTS

| | | |
|---|---|---|
| CA | 2397401 A1 | 2/2003 |
| CA | 2734167 A1 | 9/2012 |
| EP | 0 659 773 A1 | 6/1995 |
| EP | 0 811 638 A2 | 12/1997 |

OTHER PUBLICATIONS

Peri, J.B. and Hensley, A.L., Jr.; The Surface Structure of Silica Gel; The Journal of Physical Chemistry; vol. 72, No. 8, Aug. 1968; pp. 2926-2933.
Noshay, A. and Karol, F.J.; Transition Metal Catalyzed Polymerizations—Ziegler-Natta and Metathesis Polymerizations, Cambridge University Press, 1988, Edited by Roderic P. Quirk—Chemical Activation of Silica Supports for Chromocene-Based Polyethylene Catalysts; pp. 396-416.
ASTM D1238-13; Standard Test Method for Melt Flow Rates of Thermoplastics by Extrusion Plastometer; Copyright by ASTM International; Current edition approved Aug. 1, 2013. Published Aug. 2013. Originally approved in 1965. Last previous edition approved in 2010 as D1238-10; pp. 1-16.
ASTM D 792-00; Standard Test Methods for Density and Specific Gravity (Relative Density) of Plastics by Displacement; Copyright by ASTM International; Current edition approved Dec. 10, 2000. Published Mar. 2001. Originally published as D792-44. Last previous edition D792-98; pp. 1-6.
ASTM D 1928-98; Standard Practice for Preparation of Compression-Molded Polyethylene Test Sheets and Test Specimens; Copyright by ASTM International; Current edition approved Jul. 10, 1996. Published Sep. 1996. Originally published as D 1928-62 T. Last previous edition D 1928-90; pp. 1-7.

*Primary Examiner* — Catherine S Branch

(74) *Attorney, Agent, or Firm* — Julie L Heinrich

(57) ABSTRACT

A method for altering the melt flow ratio (MFR) of ethylene copolymers made in a gas phase reactor using a supported Ziegler-Natta catalyst treated with a catalyst modifier. The method involves changing the amount of the catalyst modifier added to the supported Ziegler-Natta polymerization catalyst to effect changes in the MFR of the resulting polymer.

11 Claims, No Drawings

METHOD FOR ALTERING MELT FLOW RATIO OF ETHYLENE POLYMERS

In some embodiments, the present invention relates to ethylene polymers and a method for altering melt flow ratio in a gas phase polymerization reaction by the addition of different amounts of a catalyst modifier to the supported Ziegler-Natta catalyst.

Ziegler-Natta type catalysts used in the polymerization of ethylene and alpha-olefins are well known and have been used since the early 1950's. Generally, the catalyst comprises a transition metal compound, for example titanium in the 3 or 4 valence state (e.g., $TiCl_3$ or $TiCl_4$) supported on magnesium chloride, an aluminum based co-catalyst (e.g., TEAL), and in some cases an electron donor.

Ethylene copolymers produced using Ziegler-Natta type catalysts in gas phase reactions are generally linear, with little or no long chain branching, an effect displayed in the properties of the resulting polymer. Variation of reaction conditions or catalyst properties can affect the polymers properties, and ultimately polymer processability. Increasing the melt flow ratio of a polymer, for example, increases the polymers extrusion performance and processability. Different polymer uses and applications require different properties.

Improving properties of ethylene copolymers using Ziegler-Natta catalysts has been shown by altering the catalyst components, the method for making the catalyst, or controlling the polymerization reaction. For example you can improve the polymers physical properties using trimethyl aluminum (TMA) instead of triethyl aluminum (TEAL) as a co-catalyst. Also known are methods of making a Ziegler-Natta catalyst where the sequence of addition of catalyst components can be changed in order to alter productivity of the catalyst and the physical properties of the resulting polymer. In addition it is known to alter the polymer properties by monitoring various reaction parameters and adjusting reaction variables in response to produce a product with the desired characteristics.

Another consideration when tweaking catalysts and methods for polymerization is the tendency for fouling in gas phase polymerizations. The buildup of a static charge may cause polymer agglomeration, sheeting, or chunking, which may eventually require reactor shut down. In order to improve reactor operability, several specialized catalyst preparative methods, operating conditions, and additives have been used to modify the performance of Ziegler-Natta and other catalysts to reduce reactor fouling.

One such method includes addition of an antistatic preferably into the polymerization zone of the reactor. A requirement for the antistatic agent is that it must be effective in the gaseous phase and not have any adverse effects on the catalyst and its ability to promote polymerization. The composition described includes a combination of a polysulfone copolymer (5 to 70%), a polymeric polyamine (5 to 70%) and sulfonic acid (5 to 70%).

Long chain substituted alkanolamine compounds have been used in combination with metallocenes to reduce the amount of reactor fouling in fluidized bed polymerization processes. The use of substituted alkanolamines in combination with metallocene catalysts to improve reactor operability and reduce static levels is well known. Alkanolamines have been added to a metallocene catalyst prior to addition to a reaction zone. Alkanolamines have also been added directly to a reactor or other associated parts of a fluidized bed reactor processes such as the recycle stream loop.

In contrast to metallocene catalysts, there has been no systematic exploration of the effect of long chain substituted amines, including monoalkanolamines and dialkanolamines, on supported Ziegler-Natta type catalysts.

In some embodiments, the inventors have now discovered that, surprisingly, direct or indirect treatment of a supported Ziegler-Natta catalyst with different amounts of a suitable catalyst modifier allows one to alter and hence control the melt flow ratio of an ethylene polymer or copolymer made using such a catalyst. In some embodiments, the melt flow ratio can be increased by increasing the amount of catalyst modifier, or conversely, the melt flow ratio can be decreased by decreasing the amount of catalyst modifier.

In some embodiments, the present invention provides a method for altering the melt flow ratio of an ethylene polymer or copolymer produced in a gas phase reactor using a supported Ziegler-Natta catalyst by altering amounts of a catalyst modifier added the Ziegler-Natta catalyst.

In an embodiment of the invention, the catalyst modifier comprises at least one long chain amine compound of the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is an integer, the sum of x and y is 2, and each n is independently an integer from 1 to 30.

In an embodiment of the invention, the catalyst modifier comprises at least one long chain substituted dialkanolamine of the formula: $R^1N((CH_2)_nOH)((CH_2)_mOH)$ where $R^1$ is a hydrocarbyl group having from 5 to 30 carbon atoms, and n and m are integers from 1 to 20.

In an embodiment of the invention, the catalyst modifier comprises at least one compound of the formula: $R^1N((CH_2)_xOH)_2$ where $R^1$ is a hydrocarbyl group having from 6 to 30 carbon atoms, and x is an integer from 1 to 20.

In an embodiment of the invention, the catalyst modifier comprises at least one compound of the formula: $R^1N((CH_2)_xOH)_2$ where $R^1$ is a hydrocarbyl group having from 6 to 30 carbon atoms, and x is 2 or 3.

In an embodiment of the invention, the catalyst modifier comprises at least one compound of the formula: $R^1N(CH_2CH_2OH)_2$ where $R^1$ is a hydrocarbyl group having from 8 to 22 carbon atoms.

In an embodiment of the invention, the catalyst modifier comprises a compound of the formula: $C_{18}F_{37}N(CH_2CH_2OH)_2$.

In an embodiment of the invention, the catalyst modifier comprises a mixture of compounds of the formulas: $C_{13}H_{27}N(CH_2CH_2OH)_2$ and $C_{15}H_{31}N(CH_2CH_2OH)_2$.

In an embodiment of the invention, the catalyst modifier comprises a mixture of compounds of the formula: $R^1N(CH_2CH_2OH)_2$ where $R^1$ is a hydrocarbyl group having from 8 to 18 carbon atoms.

In an embodiment of the invention, the olefin polymerization catalyst comprises: a Ziegler-Natta type catalyst; and an inert support.

In an embodiment of the invention, the olefin polymerization catalyst comprises: a Ziegler-Natta type catalyst; an inert support; and further includes a catalyst modifier.

In an embodiment of the invention, the Ziegler-Natta type catalyst comprises: a transition metal compound; an aluminum compound; a magnesium halide, and optionally an electron donor.

In an embodiment of the invention, the magnesium halide is prepared by reacting in situ an alkyl magnesium compound of the formula $(R^6)_eMgX_{2-e}$ wherein each $R^6$ is independently a $C_{1-8}$ alkyl radical and e is 1 or 2 and X is a chlorine or bromine atom, with a reactive organic halide selected from $CCl_4$ and $C_{1-6}$ alkyl halides and mixtures thereof.

In an embodiment of the invention, the Ziegler-Natta type catalyst can be synthesized in any number of ways provided that the following criteria are met:

(i) the transition metal compound cannot be added first;

(ii) when alkyl magnesium compound is added first, the transition metal compound cannot be added second;

(iii) when the aluminum alkyl is added first, the transition metal compound cannot be added second;

(iv) when the above noted magnesium compound and the aluminum compound are added first and second, in any order, the transition metal compound cannot be added third;

(v) the transitional metal compound must be added after the reactive organic halide;

(vi) the transition metal compound must be added after the above noted magnesium compound;

(vii) the electron donor, if present, cannot be added last;

(viii) the reactive organic halide cannot be added last;

(ix) if the reactive organic halide is added first the aluminum compound cannot be added second;

(x) if the aluminum compound is added first the reactive organic halide cannot be added second; and (xi) when the transition metal is last, the aluminum compound and the magnesium compound cannot be third or fourth, in any order.

Accordingly, provided is a method for altering the melt flow ratio of an ethylene polymer or copolymer, the method comprising: (A) introducing a polymerization catalyst into a gas phase reactor, the polymerization catalyst comprising i) a Ziegler-Natta type catalyst, ii) an inert support, iii) and further including from 0.01 to 10 wt % of a catalyst modifier based on the weight of i), ii) and iii) of the polymerization catalyst, the catalyst modifier comprising a compound of the formula $R^1R^2{}_xN((CH_2)_nOH)_y$ where $R^1$ is a hydrocarbyl group having from 5 to 30 carbon atoms, $R^2$ is hydrogen or a hydrocarbyl group having from 1 to 30 carbon atoms, x is 1 or 0, y is an integer, the sum of x and y is 2, and each n is independently an integer from 1 to 30; and (B) polymerizing ethylene and optionally an alpha-olefin in the gas phase reactor to give the ethylene polymer or copolymer; wherein the melt flow ratio of the ethylene polymer or copolymer is altered by changing the amount of the catalyst modifier included in the olefin polymerization catalyst by at least 0.5 wt % of i), ii) and iii) of the polymerization catalyst.

Also, provided is a method for altering the melt flow ratio of an ethylene polymer or copolymer, the method comprising: (A) introducing a polymerization catalyst into a gas phase reactor, the polymerization catalyst comprising a Ziegler-Natta type catalyst, an inert support; (B) feeding from 1 to 100 ppm of a catalyst modifier into the reactor (based on the weight of copolymer produced), the catalyst modifier comprising a compound of the formula: $R^1R^2{}_xN((CH_2)_nOH)_y$ where $R^1$ is a hydrocarbyl group having from 5 to 30 carbon atoms, $R^2$ is hydrogen or a hydrocarbyl group having from 1 to 30 carbon atoms, x is 1 or 0, y is an integer, the sum of x and y is 2, and each n is independently an integer from 1 to 30; and (C) polymerizing ethylene and optionally an alpha-olefin in the reactor to give the ethylene polymer or copolymer; wherein the melt flow ratio of the ethylene polymer or copolymer is altered by changing the amount of the catalyst modifier fed to the reactor by at least 5 ppm (based on the weight of copolymer produced).

Also provided is a method for altering the melt flow ratio of an ethylene polymer or copolymer, the method comprising: (A) introducing into a gas phase reactor, a polymerization catalyst comprising i) a Ziegler-Natta type catalyst, ii) an inert support, iii) and further including from 0.01 to 10 wt % of a catalyst modifier based on the weight of i), ii) and iii) of the polymerization catalyst; (B) feeding from 1 to 100 ppm of a catalyst modifier into the gas phase reactor; and (C) polymerizing ethylene and optionally an ($C_{4-6}$) alpha-olefin in the gas phase reactor to give the ethylene polymer or copolymer; wherein the catalyst modifier included in the polymerization catalyst and the catalyst modifier fed into the gas phase reactor is selected from compounds of the formula: $R^1R^2{}_xN((CH_2)_nOH)_y$ where $R^1$ is a hydrocarbyl group having from 5 to 30 carbon atoms, $R^2$ is hydrogen or a hydrocarbyl group having from 1 to 30 carbon atoms, x is 1 or 0, y is an integer, the sum of x and y is 2, and each n is independently an integer from 1 to 30; and wherein the melt flow ratio of the ethylene polymer or copolymer is altered by changing at least one of the following:

a) the amount of the catalyst modifier fed into the gas phase reactor by at least 5 ppm (based on the weight of copolymer produced); and b) the amount of the catalyst modifier included in the polymerization catalyst by at least 0.5 wt % of i), ii) and iii) of the polymerization catalyst.

In an embodiment of the invention, the polymerization catalyst is activated with one or more co-catalyst of the formula $R^3{}_bAl(OR^3)_aX_{3-(a+b)}$ wherein a is either 0 or 1, b is either 2 or 3 and the sum of a+b is up to 3, $R^3$ is the same or different $C_{1-10}$ alkyl radical, and X is a chlorine atom, in an amount to provide from 10 to 100 ppm of aluminum from the co-catalyst based on the polymer production rate.

In the present invention, a "catalyst modifier", when combined with a Ziegler-Natta type polymerization catalyst, or added to the reactor, or both, in various amounts, alters the melt flow ratio of ethylene polymer or copolymer products obtained in a gas phase polymerization process. The catalyst modifier, when added to the catalyst, can be added at any stage of production of the catalyst.

The melt flow ratio is defined as $I_{21}/I_2$, where $I_{21}$ is the High Load Melt Index, which refers to the mass of polymer extruded through a standard die using a 21.6 kg weight at a temperature of 190° C., and $I_2$ is the Melt Index which refers to the mass of polymer extruded through a standard die using a 2.16 kg weight (following the procedure of ASTM D-1238).

The Catalyst Modifier

The catalyst modifier employed in the present disclosure comprises a long chain amine compound. In the present invention, the terms "long chain substituted amine" or "long chain amine" are defined as tri-coordinate nitrogen compounds (i.e., amine based compounds) containing at least one hydrocarbyl group having at least 5 carbon atoms, for example from 6 to 30 carbon atoms. The terms "hydrocarbyl" or "hydrocarbyl group" includes branched or straight chain hydrocarbyl groups which may be fully saturated groups (i.e., have no double or triple bonds) or which may be partially unsaturated (i.e., they may have one or more double or triple bonds). The long chain hydrocarbyl group may also contain un-saturation in the form of aromatic ring moieties attached to or part of the main chain. The long chain amine (i.e., the tri-coordinate nitrogen compound) may also have at least one heteroatom-containing hydrocarbyl. Such heteroatom-containing hydrocarbyl groups can be branched or straight chain hydrocarbyl groups or substituted hydrocarbyl groups having one or more carbon atoms and at least one heteroatom. Heteroatom-containing hydrocarbyl groups may also contain unsaturated moieties. Suitable heteroatoms include for example, nitrogen, phosphorus or sulfur, and oxygen in any position excluding from the first carbon attached to the amine nitrogen. Other groups which may be attached to nitrogen in a long chain substituted amine compound are for example hydrocarbyl groups.

The long chain amine may be a long chain substituted monoalkanolamine, or a long chain substituted dialkanolamine. These amines have one or two hydroxyalkyl groups, respectively, as well as a hydrocarbyl group having at least 5 carbons.

The catalyst modifier employed may comprise at least one long chain amine compound of the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is an integer, the sum of x and y is 2, and each n is independently an integer from 1 to 30, in some embodiments from 1 to 20.

The catalyst modifier may comprise at least one long chain substituted dialkanolamine of the formula: $R^1N((CH_2)_nOH)((CH_2)_mOH)$ where $R^1$ is a hydrocarbyl group having anywhere from 5 to 30 carbon atoms, and n and m are integers from 1 to 20.

The catalyst modifier may comprise at least one long chain substituted dialkanolamine represented by the formula: $R^1N(CH_2)_xOH)_2$ where $R^1$ is a hydrocarbyl group having anywhere from 6 to 30 carbon atoms, and x is an integer from 1 to 20, in some embodiments 2 or 3.

The catalyst modifier may comprise at least one long chain substituted dialkanolamine of the formula: $R^1N(CH_2CH_2OH)_2$ where $R^1$ is a linear hydrocarbyl group having from 6 to 30 carbon atoms, for example from 8 to 22 carbon atoms.

The catalyst modifier may be a long chain substituted dialkanolamine of the formula: $C_{18}F_{37}N(CH_2CH_2OH)_2$.

The catalyst modifier may comprise long chain substituted dialkanolamines of the formulas: $C_{13}H_{27}N(CH_2CH_2OH)_2$ and $C_{15}H_{31}N(CH_2CH_2OH)_2$.

The catalyst modifier may comprise a mixture of long chain substituted dialkanolamines of the formula: $R^1N(CH_2CH_2OH)_2$ where $R^1$ is a hydrocarbyl group having from 8 to 18 carbon atoms.

Non-limiting examples of catalyst modifiers which can be used in the present disclosure are Kemamine® AS-990, Kemamine AS-650, Armostat® 1800, Ethomeen® 18/12, bis-hydroxy-cocoamine, 2,2'-octadecyl-amino-bisethanol, Atmer® 163 and Atmer 163-LQ-(AP).

The long chain substituted amine may also be a polyoxyethylenehydrocarbyl amine.

In an embodiment of the invention, the catalyst modifier may be a polyoxyethylenehydrocarbyl amine of the formula:

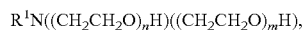

where $R^1$ is a hydrocarbyl group having from 5 to 30 carbons, and n and m are integers from 1-10 or higher (i.e., polymeric).

The Inert Support

Ziegler-Natta catalysts are used in the gas phase polymerization of ethylene. In some embodiments, the catalysts comprise a support, a magnesium compound (optionally in the presence of a halide donor to precipitate magnesium halide), a titanium compound and an aluminum compound, and optionally the presence of an electron donor. The aluminum compound may be added at different stages. It may be added to the support to chemically treat it (i.e., $Al^1$) and it may be added at some point during the manufacture of the catalyst (i.e., $Al^2$). Consequently, the compounds shall be referred to as the first aluminum compound and the second aluminum compound, respectively.

The support for the catalysts disclosed herein, in some embodiments, comprises an inorganic substrate of alumina or silica having a pendant reactive moiety. The reactive moiety may be a siloxy radical or for example is a hydroxyl radical. In one embodiment the support is silica. The support should have an average particle size from about 0.1 to 150 microns, for example from 10 to 150 microns, for example from about 20 to 100 microns. The support should have a large surface area, for example, greater than about 100 m²/g, or for example greater than about 250 m²/g, or for example from 300 m²/g to 1,000 m²/g. The support may be porous and may have a pore volume from about 0.3 to 5.0 ml/g, for example from 0.5 to 3.0 ml/g. Supports which are specifically designed to be an agglomeration of sub-particles while useful, are not required.

The support can be heat treated and/or chemically treated to reduce the level of surface hydroxyl (OH) groups in a similar fashion to that described by A. Noshay and F. J. Karol in *Transition Metal Catalyzed Polymerizations*, Ed. R. Quirk, 1989, page 396. After treatment, the support may be put into a mixing vessel and slurried with an inert solvent or diluent for example a hydrocarbon and contacted, with or without isolation or separation from the solvent or diluent, the catalyst components.

It is important that the support be dried prior to the initial reaction with the first aluminum compound. For example, the support may be heated at a temperature of at least 200° C. for up to 24 hours, for example at a temperature from 500° C. to 800° C. for about 2 to 20, for example from 4 to 10 hours. The resulting support will be free of adsorbed water and should have a surface hydroxyl content from about 0.1 to 5 mmol/g of support, or for example from 0.5 to 3 mmol/g.

A silica suitable for use herein has a high surface area and is amorphous. For example, commercially available silicas are marketed under the trademark of Sylopol® 958 and 955 by Davison Catalysts a Division of W. R. Grace and Company and ES-70W by Ineos Silica.

The amount of the hydroxyl groups in silica may be determined according to the method disclosed by J. B. Peri and A. L. Hensley, Jr., in *J. Phys. Chem.*, 72 (8), 2926, 1968, the entire contents of which are incorporated herein by reference.

While heating is one example of the means of removing OH groups inherently present in many carriers, such as silica, the OH groups may also be removed by other removal means, such as chemical means. For example, a desired proportion of OH groups may be reacted with a suitable chemical agent, such as a hydroxyl reactive aluminum compound (e.g., triethyl aluminum) or a silane compound. This method of treatment has been disclosed in the literature and two relevant examples are: U.S. Pat. No. 4,719,193 to Levine in 1988 and by Noshay A. and Karol F. J. in *Transition Metal Catalyzed Polymerizations*, Ed. R. Quirk, 396, 1989. For example the support may be treated with the first aluminum compound of the formula $R^4_bAl(OR^4)_aX_{3-(a+b)}$ wherein a is an integer from 0 to 3, b is an integer from 0 to 3 and the sum of a+b is from 0 to 3, $R^4$ is the same or different $C_{1-10}$ alkyl radical and X is a chlorine atom. The amount of first aluminum compound is such that the amount of aluminum on the support prior to adding the remaining catalyst components will be from about 0.5 to 2.5 weight %, for example from 1.0 to 2.0 weight % based on the weight of the support. The remaining aluminum content is added as a subsequent or second component of the catalyst (e.g., $Al^2$). The first and second aluminum compounds may be the same or different. If the first and second aluminum compounds are the same the electron donor is for example present.

The Ziegler-Natta Type Catalyst

Examples of the Ziegler-Natta catalyst useful in accordance with the present disclosure comprise: (A) a titanium compound of the formula $Ti(OR^5)_cX_d$ wherein $R^5$ is selected from a $C_{1-4}$ alkyl radical, and a $C_{6-10}$ aromatic radical, X is selected from a chlorine atom and a bromine atom, c is 0 or an integer up to 4 and d is 0 or an integer up to 4 and the sum of c+d is the valence of the Ti atom; (B) a second aluminum compound of the formula $R^6{}_bAl(OR^6)_aX_{3-(a+b)}$ wherein a is an integer from 0 to 3, b is an integer from 0 to 3 and the sum of a+b is from 0 to 3, $R^6$ is the same or different $C_{1-10}$ alkyl radical and X is a halogen atom, for example a chlorine atom; (C) a magnesium halide prepared by reacting in situ an alkyl magnesium compound of the formula $(R^7)_eMgX_{2-e}$ wherein each $R^7$ is independently a $C_{1-8}$ alkyl radical, e is 1 or 2, and X is selected from a chlorine atom and a bromine atom, with a reactive organic halide selected from $CCl_4$ and $C_{1-6}$ alkyl halides for example $C_{3-6}$ secondary and tertiary alkyl halides, for example chlorides or a mixture thereof; and (D) optionally an electron donor, a molar ratio of total Al to Ti (e.g., the first and second aluminum additions $Al^1$ and $Al^2$—for example from 0 to 70 weight % of the aluminum compound is used to treat the support and the remaining aluminum is added at some time during the rest of the catalyst synthesis) from 2:1 to 15:1; a molar ratio of Al from the second aluminum compound addition to Ti from 1:1 to 8:1; a molar ratio of Mg:Ti from 1:1 to 20:1, for example 2:1 to 12:1; a molar ratio of active halide (this excludes the halide from the Al and Ti compounds if present) from the $CCl_4$ or $C_{1-6}$ for example $C_{3-6}$ alkyl halide or mixtures thereof to Mg from 1:1 to 6:1, for example 1.5:1 to 5:1; and a molar ratio of electron donor to Ti from 0:1 to 18:1, for example from 0.5:1 to 15:1.

In some embodiments, the catalyst components are reacted in an organic medium such as an inert $C_{5-10}$ hydrocarbon that may be unsubstituted or is substituted by a $C_{1-4}$ alkyl radical. Some solvents include pentane, isopentane, hexane, isohexane, heptane, octane, cyclohexane, methyl cyclohexane, hydrogenated naphtha and ISOPAR® E (a solvent available from Exxon Chemical Company) and mixtures thereof.

In some embodiments, the aluminum compounds useful in the formation of the catalyst in accordance with the present disclosure have the formula $R^6{}_bAl(OR^6)_aX_{3-(a+b)}$ wherein a is an integer from 0 to 3, for example 0 or 1, b is an integer from 0 to 3 for example 2 or 3 most for example 3, and the sum of a+b is from 0 to 3 for example 3, $R^6$ is the same or different $C_{1-10}$, for example a $C_{1-8}$ alkyl radical and X is a halogen atom for example a chlorine atom. Suitable aluminum compounds include trimethyl aluminum (TMA), Methyl aluminum (TEAL), diethyl aluminum ethoxide, diisobutyl aluminum ethoxide, isoprenyl aluminum, tri-isobutyl aluminum (TiBAL), diethyl aluminum chloride (DEAC), tri-n-hexyl aluminum (TnHAl), tri-n-octyl aluminum (TnOAl), and mixtures thereof. The aluminum compounds containing a halide may be an aluminum sesquihalide. For example, in the first aluminum compound a is 0, b is 3 and $R^6$ is a $C_{1-8}$ alkyl radical.

The magnesium compound may be a compound of the formula $(R^7)_eMgX_{2-e}$ wherein each $R^7$ is independently a $C_{1-8}$ alkyl radical and e is 1 or 2. Some commercially available magnesium compounds include butyl octyl magnesium, dibutyl magnesium and butyl ethyl magnesium. If the magnesium compound is soluble in the organic solvent it may be used in conjunction with a $C_{3-6}$ halogenating agent or reactive organic halide to form magnesium halide (i.e., $MgX_2$ where X is a halogen for example chlorine or bromine, or for example chlorine), which precipitates from the solution (potentially forming a substrate for the Ti compound).

Some halogenating agents (e.g., reactive organic halides) include $CCl_4$ or one or more secondary or tertiary halides, for example chlorides, of the formula $R^8Cl$ wherein $R^8$ is selected from $C_{1-6}$ alkyl radicals for example secondary and tertiary $C_{3-6}$ alkyl radicals. Suitable chlorides include sec-butyl chloride, t-butyl chloride and sec-propyl chloride. The reactive halide is added to the catalyst in a quantity such that the molar ratio of active halide (e.g., chloride from the reactive organic halide):Mg should be from 1:1 to 6:1, for example from 1.5:1 to 5:1, or for example from 1.5:1 to 3:1 or for example from 1.9:1 to 3:1.

The titanium compound in the catalyst has the formula $Ti(PR^5)_cX_d$ wherein $R^5$ is selected from a $C_{1-4}$ alkyl radical, and a $C_{6-10}$ aromatic radical, X is selected from a chlorine atom and a bromine atom for example chlorine, c is 0 or an integer up to 4 and d is 0 or an integer up to 4 and the sum of c+d is the valence of the Ti atom. The titanium compound may be selected from $TiCl_3$, $TiCl_4$, $Ti(OC_4H_9)_4$, $Ti(OC_3H_7)_4$, and $Ti(OC_4H_9)Cl_3$. In some embodiments, the titanium compound is selected from $Ti(OC_4H_9)_4$ and $TiCl_4$ and mixtures thereof. In some embodiments, the titanium in the catalyst or catalyst precursor is present in an amount from 0.20 to 3, for example from 0.20 to 1.5, or for example from 0.25 to 1.0 weight % based on the final weight of the catalyst (including the support).

As noted above, an electron donor may be, and in fact is in some embodiments, used in the catalyst used in accordance with the present invention. The electron donor may be selected from $C_{3-18}$ linear or cyclic aliphatic or aromatic ethers, ketones, esters, aldehydes, amides, nitriles, amines, phosphines or siloxanes. For example, the electron donor is selected from diethyl ether, triethyl amine, 1,4-dioxane, tetrahydrofuran, acetone, ethyl acetate, and cyclohexanone and mixtures thereof. The electron donor when present may be used in a molar ratio to the titanium from 0.5:1 to 18:1 for example in a molar ratio to Ti from 1:1 to 15:1, or for example from 2:1 to 12:1.

In the catalyst, the molar ratio of Mg:Ti may be from 1:1 to 20:1, for example from 2:1 to 12:1, or for example from 3:1 to 10:1. The molar ratio of second aluminum ($Al^2$) to titanium in the catalyst may be from 1:1 to 8:1, for example from 1.5:1 to 7:1, or for example from 2:1 to 6:1. In some embodiments, from 0 to not more than about 70 weight %, for example from 10 to 60 weight %, of the aluminum (compound in the catalyst) may be used to treat the support (e.g. $Al^1$). The molar ratio of active halide (from the reactive organic halide) to Mg may be from for example 1.5:1 to 5:1, or for example from 1.5:1 to 3:1, or for example from 1.9:1 to 3:1. The molar ratio of electron donor, if present, to Ti may be from 0.5:1 to 18:1, for example from 1:1 to 15:1, or for example from 2:1 to 12:1. The molar ratio of total Al:Mg in the catalyst or catalyst precursor may be from 0.35:1 to 3:1, for example from 0.4:1 to 2:1.

In some embodiments, the catalyst is prepared in a hydrocarbon solvent at a temperature from 0° C. to 100° C. in which the order of chemical addition meets the following conditions:

(i) the transition metal compound cannot be added first;
(ii) when the Mg compound is added first, the transition metal compound cannot be added second;
(iii) when the second aluminum alkyl is added first, the transition metal compound cannot be added second;

(iv) when the Mg compound and the second aluminum alkyl compound are added first and second, in any order, the transition metal compound cannot be added third;

(v) the transitional metal compound must be added after the reactive organic halide;

(vi) the transition metal compound must be added after the alkyl magnesium compound;

(vii) the electron donor cannot be added last;

(viii) the reactive organic halide cannot be added last;

(ix) if the reactive organic halide is added first the second aluminum alkyl compound cannot be added second;

(x) if the second aluminum alkyl compound is added first the reactive organic halide cannot be added second; and (xi) when the transition metal is added last, the second aluminum alkyl and Mg compounds cannot be added third or fourth, in any order.

There are 120 different ways in which to produce a catalyst using the above five compounds (e.g., for any given 5 components assuming the treated silica is added first, they may be mixed in 120 different ways). However, by employing the above restrictions, are allowed. The catalyst should have a productivity of greater than 1,500 grams of polymer per gram of catalyst (g/g) under standard commercial plant operations for an ethylene hexene copolymer having an MI of 1 and a density of 0.918. The conditions of operation of a plant to produce a resin having a melt index (MI) of 1 as determined by ASTM D 1238-04 and a density of 0.918 g/cc as determined by ASTM D 792-00 are well known to those skilled in the art.

Addition of the Catalyst Modifier

To alter the melt flow ratio of an ethylene polymer or copolymer made using a Ziegler-Natta polymerization catalyst and an inert support a catalyst modifier (defined as above) is added as part of the polymerization catalyst, to a reactor zone (or associated process equipment) separately from the polymerization catalyst, or both.

The amount of catalyst modifier included in a polymerization catalyst is expressed herein as a weight percent (wt %) of the catalyst modifier based on the combined weight of the Ziegler-Natta type catalyst, the inert support, the catalyst modifier, and optionally the electron donor.

The amount of catalyst modifier added to a reactor (or other associated process equipment) is expressed herein as the parts per million (ppm) of catalyst modifier based on the weight of copolymer produced.

The catalyst modifier may be added to a polymerization reactor in a number of ways. The catalyst modifier may be added to a reactor system separately from the polymerization catalyst or it may be combined with the polymerization catalyst prior to feeding the combination to a reactor system.

If the catalyst modifier is added to the polymerization catalyst prior to adding the polymerization catalyst to a reactor, then the catalyst modifier can be added at any point during the preparation of the polymerization catalyst. In specific embodiments of the invention, the catalyst modifier may be added to the support prior to contact with any of the Ziegler-Natta type catalyst components; the catalyst modifier may be added after the Mg compound and before the second aluminum compound has been added to the support; the catalyst modifier may be added after the second aluminum compound and before the Mg compound has been added to the support; the catalyst modifier may be added after the electron donor has been added to the support. Also, the catalyst modifier can be added in portions less than the total amount desired during any stage of the preparation of the polymerization catalyst provided the sum of the portions add up to the total amount of catalyst modifier required.

In an embodiment of the present invention, the catalyst modifier is added to the polymerization catalyst already comprising the Ziegler-Natta type catalyst, with or without an electron donor, and the inert support. The catalyst modifier can be added to the polymerization catalyst offline and prior to addition of the polymerization catalyst to the polymerization zone, or the catalyst modifier may be added to the polymerization catalyst on route to a polymerization reactor.

The catalyst modifier may be included in the polymerization catalyst (or where appropriate, added to a polymerization catalyst component or components which comprise at least one of the Ziegler-Natta type catalyst and the inert support in any suitable manner. By way of non-limiting example, the catalyst modifier may be dry blended (if it is a solid) with the polymerization catalyst (or a polymerization catalyst component) or it may be added neat (if the catalyst modifier is a liquid) or it may be added as a solution or slurry in a suitable hydrocarbon solvent or diluent respectively. The polymerization catalyst (or polymerization catalyst components) can likewise be put into solution or made into a slurry using suitable solvents or diluents respectively, followed by addition of the catalyst modifier (as a neat solid or liquid or as a solution or a slurry in suitable solvents or diluents) or vice versa. Alternatively, the catalyst modifier may be deposited onto a separate support and the resulting supported catalyst modifier blended either dry or in a slurry with the polymerization catalyst (or a polymerization catalyst component).

The catalyst modifier may be fed to a reactor system using any appropriate method known to persons skilled in the art. For example, the catalyst modifier may be fed to a reactor system as a solution or as a slurry in a suitable solvent or diluent respectively. Suitable solvents or diluents are inert hydrocarbons well known to persons skilled in the art and include for example aromatics, paraffins, and cycloparaffinics such as for example benzene, toluene, xylene, cyclohexane, fuel oil, isobutane, mineral oil, kerosene and the like. Further specific examples include but are not limited to hexane, heptanes, isopentane and mixtures thereof. Alternatively, the catalyst modifier may be added to an inert support material and then fed to a polymerization reactor as a dry feed or a slurry feed. The catalyst modifier may be fed to various locations in a reactor system. When considering a fluidized bed process for example, the catalyst modifier may be fed directly to any area of the reaction zone,) or any area of the entrainment zone, or it may be fed to any area within the recycle loop, where such areas are found to be effective sites at which to feed a catalyst modifier.

When added as a mixture with a solvent or diluent, the catalyst modifier may make up, for example, from 0.1 to 30 wt % of the solution or mixture, or from 0.1 to 20 wt %, or from 0.1 to 10 wt %, or from 0.1 to 5 wt % or from 0.1 to 2.5 wt % or from 0.2 to 2.0 wt %, although a person skilled in the art will recognize that further, possibly broader ranges, may also be used and so the invention should not be limited in this regard.

The catalyst modifier can be added to a reactor with all or a portion of one or more of the monomers or other components of the cycle gas.

The catalyst modifier can be added to the reactor through a dedicated feed line or added to any convenient feed stream including an ethylene feed stream, a comonomer feed stream, a catalyst feed line or a recycle line.

The catalyst modifier can be fed to a location in a fluidized bed system in a continuous or intermittent manner.

The rate of addition of a catalyst modifier to a reactor may be programmed using measured reactor static levels (or other lead indicators such as reactor temperature) as programming inputs, so as to maintain a constant or predetermined level of static (or for example, temperature) in a polymerization bed. The catalyst modifier may be added to a reactor at a time before, after or during the start of the polymerization reaction.

In an embodiment of the invention, the catalyst modifier is added directly to a reaction zone within the fluidized bed, separately from the polymerization catalyst. In some embodiments, it is so added by injecting a solution or mixture of the catalyst modifier directly into a reaction zone.

The catalyst modifier may be combined with the polymerization catalyst before adding the combination directly to a reaction zone.

The catalyst modifier may be added to a polymer seed bed present in a reactor prior to starting the polymerization reaction by introduction of a catalyst.

In an embodiment of the invention, the catalyst modifier is added directly to a reaction zone during polymerization, separately from a polymerization catalyst, and the catalyst modifier is added as a mixture with an inert hydrocarbon.

The total amount of catalyst modifier that may be fed to a reactor and/or included in the polymerization catalyst is not specifically limited, but it should not exceed an amount which causes the Ziegler-Natta type polymerization catalyst activity to drop to below that which would be commercially acceptable (e.g., 1500 g of polymer per g of catalyst).

In this regard, the amount of catalyst modifier fed to a reactor will for example not exceed about 150 ppm, or 100 ppm, or 75 ppm, or 50 ppm, or 25 ppm (parts per million based on the weight of the (co)polymer being produced) while the amount of catalyst modifier included in the polymerization catalyst will for example not exceed about 10 wt % (based on the combined weight of the Ziegler-Natta type catalyst, the catalyst modifier, and the inert support).

In embodiments of the invention, addition of the catalyst modifier to the reactor—not the polymerization catalyst—will be at levels from 150 to 1 ppm, and including narrower ranges within this range, such as but not limited to, or from 150 to 5 ppm, or from 100 to 1 ppm, or from 100 to 5 ppm, or from 75 to 1 ppm, or from 75 to 5 ppm, or from 50 to 1 ppm, or from 50 to 5 ppm, or from 25 to 1 ppm, or from 25 to 5 ppm (parts per million by weight of the polymer being produced).

In embodiments of the invention, the amount of catalyst modifier included in the polymerization catalyst will be from 0.01 to 10 wt %, and including narrower ranges within this range, such as but not limited to, from 0.02 to 4.0 wt %, or from 0.05 to 6.0 wt %, or from 0.1 to 3.5 wt %, or from 0.20 to 3.5 wt %, or from 0.5 to 3.5 wt %, or from 1.0 to 4.5 wt %, or from 0.75 to 4.0 wt %, or from 0.01 to 4.0 wt %, or from 0.5 to 4.0 wt %, or from 1.0 to 4.0 wt %, or from 1.25 to 3.75 wt %, or from 1.0 to 3.5 wt %, or from 1.5 to 3.5 wt %, or from 0.75 to 3.75 wt %, or from 1.0 to 3.75 wt % (wt % is the weight percent of the catalyst modifier based on the combined weight of the Ziegler-Natta type catalyst, the catalyst modifier, and the inert support). A person skilled in the art will appreciate that higher levels of catalyst modifier may be used although doing so may result in reduction or loss of catalytic activity.

The Polymerization Process

Olefin polymerization processes which are compatible with the current disclosure include gas phase, slurry phase, and combined slurry and gas phase polymerization processes, with gas phase processes being one example of a preferred embodiment. For example, ethylene copolymerization with an alpha-olefin is carried out in the gas phase, in for example a fluidized bed reactor.

Detailed descriptions of slurry polymerization processes are widely reported in the patent literature. For example, particle form polymerization, or a slurry process where the temperature is kept below the temperature at which the polymer goes into solution is described in U.S. Pat. No. 3,248,179. Slurry processes include those employing a loop reactor and those utilizing a single stirred reactor or a plurality of stirred reactors in series, parallel, or combinations thereof. Non-limiting examples of slurry processes include continuous loop or stirred tank processes. Further examples of slurry processes are described in U.S. Pat. No. 4,613,484.

Slurry processes are conducted in the presence of a hydrocarbon diluent such as an alkane (including isoalkanes), an aromatic or a cycloalkane. The diluent may also be the alpha olefin comonomer used in copolymerizations. Alkane diluents include propane, butanes, (i.e., normal butane and/or isobutane), pentanes, hexanes, heptanes and octanes. The monomers may be soluble in (or miscible with) the diluent, but the polymer is not (under polymerization conditions). The polymerization temperature is for example from about 5° C. to about 200° C., or for example less than about 120° C. for example from about 10° C. to 100° C. The reaction temperature is selected so that an ethylene polymer or copolymer is produced in the form of solid particles. The reaction pressure is influenced by the choice of diluent and reaction temperature. For example, pressures may range from 15 to 45 atmospheres (about 220 to 660 psi or about 1500 to about 4600 kPa) when isobutane is used as diluent (see, for example, U.S. Pat. No. 4,325,849) to approximately twice that (i.e., from 30 to 90 atmospheres—about 440 to 1300 psi or about 3000-9100 kPa) when propane is used (see U.S. Pat. No. 5,684,097). The pressure in a slurry process must be kept sufficiently high to keep at least part of the ethylene monomer in the liquid phase. The reaction in some embodiments takes place in a jacketed closed loop reactor having an internal stirrer (e.g. an impeller) and at least one settling leg. Catalyst, monomers and diluents are fed to the reactor as liquids or suspensions. The slurry circulates through the reactor and the jacket is used to control the temperature of the reactor. Through a series of let-down valves the slurry enters a settling leg and then is let down in pressure to flash the diluent and unreacted monomers and recover the polymer generally in a cyclone. The diluent and unreacted monomers are recovered and recycled back to the reactor.

A gas phase process is commonly carried out in a fluidized bed reactor. Such gas phase processes are widely described in the literature (see for example U.S. Pat. Nos. 4,543,399; 4,588,790; 5,028,670; 5,317,036; 5,352,749; 5,405,922; 5,436,304; 5,433,471; 5,462,999; 5,616,661 and 5,668,228). In some embodiments, a fluidized bed gas phase polymerization reactor employs a "bed" of polymer and catalyst which is fluidized by a flow of monomer and other optional components which are at least partially gaseous. Heat is generated by the enthalpy of polymerization of the monomer (and optional comonomer(s)) flowing through the bed. Unreacted monomer and other optional gaseous components exit the fluidized bed and are contacted with a condenser in the recycle line typically downstream from a compressor to remove this heat. The cooled gas stream, including monomer, and optional other components (such as condensable liquids), is then re-circulated through the polymerization zone, together with "make-up" monomer to replace that which was polymerized on the previous pass. Simultaneously, polymer product is withdrawn from the reactor. As will be appreciated by those skilled in the art, the "fluidized" nature of the polymerization bed helps to evenly distribute/mix the heat of reaction and thereby minimize the formation of localized temperature gradients (hot spots).

The reactor pressure in a gas phase process may vary from about atmospheric to about 600 Psig. In another embodiment, the pressure can range from about 100 psig (690 kPa) to about 500 psig (3448 kPa). In yet another embodiment, the pressure can range from about 200 psig (1379 kPa) to about 400 psig (2759 kPa). In still another embodiment, the pressure can range from about 250 psig (1724 kPa) to about 350 psig (2414 kPa).

The reactor temperature in a gas phase process may vary according to the heat of polymerization as described above. Care should be taken to avoid the reaction temperature exceeding the sticking temperature of the reaction products. The reactor temperature can be from about 30° C. to about 110° C., for example from about 60° C. to about 110° C. In some instances the reactor temperature can be from about 70° C. to about 110° C., for example from about 70° C. to about 100° C. The fluidized bed process described above is well adapted for the preparation of polyethylene and ethylene copolymers. Hence, monomers and comonomers include ethylene and $C_{3-6}$ alpha olefins which are unsubstituted or substituted by up to two $C_{1-6}$ hydrocarbyl radicals.

In an embodiment of the present invention, ethylene is copolymerized with an alpha olefin having from 3 to 6 carbon atoms and ethylene makes up at least 75 wt %, for example at least 85 wt % of the total olefin feed entering the reactor.

In embodiments of the present invention, ethylene is copolymerized with one or more of propylene, 1-butene, 1-hexene or 1-octene.

Gas phase fluidized bed polymerization processes employ a polymer seed bed in the reactor prior to initiating the polymerization process. It is contemplated by the current disclosure to use a polymer seed bed that has been treated with a catalyst modifier or an optional scavenger (see below). In addition, the polymer products obtained by using the catalysts and processes described herein may themselves be used as polymer seed bed materials.

Optional Scavenger

Optionally, scavengers may be added to the polymerization process. In some embodiments, the processes described herein may be carried out in the presence of any suitable scavenger or scavengers. Scavengers are well known in the art.

In an embodiment of the invention, scavengers are organoaluminum compounds having the formula: $Al^3(X^3)_p(X^4)_{3-p}$ where $(X^3)$ is a hydrocarbyl having from 1 to about 20 carbon atoms; $(X^4)$ is selected from alkoxide or aryloxide, any one of which having from 1 to about 20 carbon atoms; halide; or hydride; and p is a number from 1 to 3, inclusive; or hydrocarbyl aluminoxanes having the formula: $R^9{}_2Al^1O(R^9Al^1O)_qAl^1R^9{}_2$ wherein each $R^9$ is independently selected from $C_{1-20}$ hydrocarbyl radicals and q is from 3 to 50. Some non-limiting examples of scavengers useful for the processes described herein include triisobutylaluminum, triethylaluminum, trimethylaluminum or other trihydrocarbyl aluminum compounds. The scavenger may be used in any suitable amount but by way of non-limiting examples only, can be present in an amount to provide a molar ratio of Al:Ti of from about 20 to about 2000, or from about 50 to about 1000, or from about 100 to about 500. In some embodiments, the scavenger is added to the reactor prior to the polymerization catalyst and in the absence of additional poisons and over time declines to 0, or is added continuously.

Optionally, the scavengers may be independently supported. For example, an inorganic oxide that has been treated with an organoaluminum compound or hydrocarbyl aluminoxane may be added to the polymerization reactor. The method of addition of the organoaluminum or hydrocarbyl aluminoxane compounds to the support is not specifically defined and is carried out by procedures well known in the art.

A scavenger may optionally be added to the catalyst modifier prior to feeding the catalyst modifier to a reactor or prior to combining the catalyst modifier with the polymerization catalyst (or one or more polymerization catalyst components). Alternatively a scavenger may be combined with the catalyst modifier on route to a polymerization reactor.

Activation with Co-Catalyst

The co-catalyst may be selected from tri $C_{1-8}$ alkyl or alkenyl; aluminums, alkyl aluminum chlorides (e.g., di $C_{1-8}$ alkyl aluminum chloride), and mixtures thereof. This includes trimethyl aluminum, triethyl aluminum, tripropyl aluminum, tributyl aluminum, triisobutyl aluminum, diethyl aluminum ethoxide, diisobutyl aluminum ethoxide, isoprenylaluminum, tri-n-hexyl aluminum, tri-octyl aluminum, diethyl aluminum chloride, dibutyl aluminum chloride, and mixtures thereof. An example co-catalyst is triethyl aluminum. While the aluminum halides might be useful in accordance with the present disclosure they nay increase the amount of halide in the polymer resulting in increased consumption of additives to neutralize and stabilize the resulting polymer and are therefore not preferred.

The co-catalyst may be fed to the reactor to provide from 10 to 100, for example, 10 to 50, or for example 16 to 50 or for example from 17 to 30, or for example from 20 to 26 ppm of aluminum (Al ppm) based on the polymer production rate. Such a process is more fully described in Canadian Patent Application 2,397,401 laid open Feb. 20, 2003 (the text of which is hereby incorporated by reference). In some instances by using the Al ppm control technique the resin stickiness may be reduced and productivity increased up to about 20%. Also, the variability in resin properties and process control parameters including melt index, density, hexane extractables, hydrogen and co-monomer response may be reduced by up to 50%.

Polymer

The polymer compositions made herein are for example copolymers of ethylene and an alpha olefin selected from 1-butene, 1-hexene and 1-octene.

In embodiments of the invention, the copolymer composition will comprise at least 75 wt % of ethylene units, or at least 80 wt % of ethylene units, or at least 85 wt % of ethylene units with the balance being an alpha-olefin unit, based on the weight of the copolymer composition.

Polymer properties such as average molecular weight (e.g., Mw, Mn and Mz), molecular weight distribution (i.e., Mw/Mn), density, melt indices (e.g., $I_2$, $I_{21}$) as determined by ASTM D1238, melt index or melt flow ratios (e.g., $I_{21}/I_2$), comonomer distribution breadth index (CDBI), TREF-profile, comonomer distribution profile, and the like as these terms are defined further below and in for example co-pending CA Application No. 2,734,167 (to the same Applicant) are not specifically defined, but by way of non-limiting example only, the polymer compositions made using the present invention, may have a density of from 0.910 g/cc to 0.930 g/cc, a melt index of from 0.1 to 10.0 g/10 min, a melt flow ratio ($I_{21}/I_2$) of from 14 to 30, a weight average molecular weight of from 40,000 to 200,000, and a broad TREF profile.

Altering Melt Flow Ratio

In the present invention, the melt flow ratio of an ethylene polymer or copolymer is altered by changing the amount of catalyst modifier included in a polymerization catalyst.

The amount of catalyst modifier included in the polymerization catalyst is changed by at least 0.5 wt % (based on the combined weight of the Ziegler-Natta type catalyst, the catalyst modifier, and the inert support), for example at least, or at least 0.75 wt %, or at least 1.0 wt %, or at least 1.5 wt %, or at least 2.0 wt %, or at least 2.5 wt %, or at least 3.0 wt %, or at least 3.5 wt %.

The amount of catalyst modifier included in the polymerization catalyst is changed by from 0.01 to 10 wt % and including smaller ranges within this range, such as but not limited to, from 0.01 to 5.0 wt %, or from 0.5 to 4.5 wt %, or from 0.5 to 4.0 wt %, or from 0.5 to 3.5 wt %, or from 0.5 to 3.0 wt %, or from 0.5 to 2.5 wt c/o, or from 0.5 to 2.0 wt %, or from 0.5 to 1.5 wt %, or from 0.5 to 1.25 wt %, or from 0.5 to 1.0 wt % (based on the combined weight of the Ziegler-Natta type catalyst, the catalyst modifier, and the inert support).

The amount of catalyst modifier fed to a reactor is changed by at least 1 ppm (based on the weight of the copolymer produced), for example at least 2.5 ppm, or at least 5 ppm, or at least 10 ppm, or at least 20 ppm, or at least 25 ppm.

In embodiments of the invention, the amount of catalyst modifier fed to a reactor is changed by from 1 to 100 ppm and including smaller ranges within this range, such as but not limited to, from 5 to 75 ppm, or from 5 to 50 ppm, or from 5 to 40, or from 5 to 30 ppm, or from 5 to 25 ppm, or from 5 to 20 ppm, or from 5 to 15 ppm, or from 5 to 10 ppm, or from 1 to 25 ppm, or from 1 to 20 ppm or from 1 to 15 ppm or from 1 to 10 ppm, or from 1 to 5 ppm (based on the weight of the copolymer produced).

In an embodiment of the invention, altering at least one of the following: a) the amount of catalyst modifier present in the polymerization catalyst; b) the amount of catalyst modifier fed to a gas phase reactor; changes the melt flow ratio of an ethylene polymer or copolymer made with the polymerization catalyst.

In an embodiment of the invention, the melt flow ratio of an ethylene polymer or copolymer is altered by polymerizing ethylene and optionally at least one alpha-olefin in a gas phase reactor in the presence of a polymerization catalyst by changing at least one of the following: a) the amount of catalyst modifier present in the polymerization catalyst by at least 0.5 wt %, or by at least 0.75%, or by at least 1.0 wt %; and b) the amount of catalyst modifier fed to the reactor by at least 2.5 ppm, or by at least 5 ppm, or by at least 10 ppm;

In an embodiment of the invention, the melt flow ratio of an ethylene polymer or copolymer is altered using a method comprising: introducing a polymerization catalyst into a gas phase reactor, the polymerization catalyst comprising i) a Ziegler-Natta type catalyst, ii) an inert support, and further including from 0.5 to 10 wt % of a catalyst modifier based on the weight of i) and ii) of the polymerization catalyst, the catalyst modifier comprising a compound having the formula $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is an integer, the sum of x and y is 2, and each n is independently an integer from 1 to 30; and polymerizing ethylene and optionally an alpha-olefin in the gas phase reactor to give the ethylene polymer or copolymer; wherein the melt flow ratio of the ethylene polymer or copolymer is altered by changing the amount of the catalyst modifier included in the olefin polymerization catalyst by at least 0.5 wt % (based on the weight of i) and ii) of the polymerization catalyst).

In an embodiment of the invention, the melt flow ratio of an ethylene polymer or copolymer is altered using a method comprising: i) introducing a polymerization catalyst into a gas phase reactor, the polymerization catalyst comprising a Ziegler-Natta type catalyst and an inert support, feeding from 1 to 100 ppm of a catalyst modifier into the reactor (based on the weight of copolymer produced), the catalyst modifier comprising a compound having the formula: $R^1R^2_xN((CH_2)_nOH)_y$ where $R^1$ is a hydrocarbyl group having from 5 to 30 carbon atoms, $R^2$ is hydrogen or a hydrocarbyl group having from 1 to 30 carbon atoms, x is 1 or 0, y is an integer, the sum of x and y is 2, and each n is independently an integer from 1 to 30; and polymerizing ethylene and optionally an alpha-olefin in the reactor to give the ethylene polymer or copolymer; wherein the melt flow ratio of the ethylene polymer or copolymer is altered by changing the amount of the catalyst modifier fed to the reactor by at least 5 ppm (based on the weight of copolymer produced).

In an embodiment, the melt flow ratio of an ethylene polymer or copolymer, is altered using a method comprising: introducing a polymerization catalyst into a gas phase reactor, the polymerization catalyst comprising i) a Ziegler-Natta type catalyst, ii) an inert support, and further including from 0 to 10 wt % of a catalyst modifier (based on the weight of the polymerization catalyst); feeding from 1 to 100 ppm of a catalyst modifier into the gas phase reactor (based on the weight of copolymer produced); and polymerizing ethylene and optionally an alpha-olefin in the gas phase reactor to give the ethylene polymer or copolymer; wherein the catalyst modifier included in the polymerization catalyst and the catalyst modifier fed into the gas phase reactor comprise a compound having the formula: $R^1R^2_xN((CH_2)_nOH)_y$ where $R^1$ is a hydrocarbyl group having from 5 to 30 carbon atoms, $R^2$ is hydrogen or a hydrocarbyl group having from 1 to 30 carbon atoms, x is 1 or 0, y is an integer, the sum of x and y is 2, and each n is independently an integer from 1 to 30; and wherein the melt flow ratio of the ethylene polymer or copolymer is altered by changing at least one of the following: a) the amount of the catalyst modifier fed into the gas phase reactor by at least 5 ppm (based on the weight of copolymer produced); b) the amount the catalyst modifier included in the polymerization catalyst by at least 0.5 wt % (based on the weight of i) and ii) of the polymerization catalyst).

The catalyst modifier included in the polymerization catalyst may comprise a different or the same type of long chain amine compound than the catalyst modifier fed into the gas phase reactor.

Melt flow ratio is defined as the high load melt index $I_{21}$, divided by the melt index $I_2$ (i.e., $I_{21}/I_2$) as determined by ASTM D1238. The values of melt flow ratio are a rough estimate of the molecular weight distribution of the ethylene polymer or copolymer produced. The higher the melt flow ratio the broader the molecular weight distribution. Polymers with narrow molecular weight distribution give rise to stronger products but are more difficult to extrude compared to resins with broader molecular weight distribution. It is known that polymers with higher melt flow ratios have better processability than polymers with lower melt flow ratios.

The melt flow ratio of an ethylene polymer or copolymer may be altered by changing one or more of the following: a) the amount of catalyst modifier fed to the reactor; b) the amount of catalyst modifier included in the polymerization catalyst.

Increasing or decreasing the amount of catalyst modifier fed to a polymerization reactor by at least 5 ppm (based on the weight of copolymer produced) increases or decreases, respectively, the melt flow ratio of an ethylene polymer or copolymer made with an olefin polymerization catalyst comprising: a Ziegler-Natta type catalyst and an inert support.

Increasing or decreasing the amount of catalyst modifier fed to a polymerization reactor by at least 5 ppm (based on the weight of copolymer produced) increases or decreases, respectively, the melt flow ratio of an ethylene polymer or copolymer made in the presence 1 to 100 ppm of catalyst modifier (i.e. the total amount of catalyst modifier fed directly to the reactor, based on the weight of copolymer produced) with an olefin polymerization catalyst comprising: a Ziegler-Natta type catalyst, an inert support and optionally a catalyst modifier.

An ethylene polymer or copolymer made in the presence of from 15 to 35 ppm of catalyst modifier (i.e., the total amount of catalyst modifier fed directly to the reactor, based on the weight of copolymer produced) with a polymerization catalyst comprising: i) a Ziegler-Natta type catalyst, and ii) an inert support may have an increase in melt flow ratio of at least 3%, in some cases at least 5%, in further cases at least 7% higher melt flow ratio.

Increasing or decreasing the amount of catalyst modifier present in an olefin polymerization catalyst comprising: i) a Ziegler-Natta type catalyst, ii) an inert support and further including from 0.01 to 10 wt % of a catalyst modifier (based on the weight of the polymerization catalyst including the catalyst modifier) by at least 0.5 wt %, increases or decreases, respectively, the melt flow ratio of an ethylene polymer or copolymer made with the polymerization catalyst.

An ethylene polymer or copolymer made with a polymerization catalyst comprising: i) a Ziegler-Natta type catalyst, ii) an inert support and further including from 0.5 to 4.5 wt % of a catalyst modifier (based on the weight of the polymerization catalyst); has an at least 3%, or at least 5%, or at least 7% higher melt flow ratio than an ethylene polymer or copolymer made with a catalyst comprising: i) a Ziegler-Natta type catalyst, ii) an inert support, but no catalyst modifier.

The melt flow ratio of an ethylene polymer or copolymer may be altered by feeding from 1 to 100 ppm of a catalyst modifier-comprising a compound having the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1; polymerizing ethylene and optionally an alpha-olefin in the reactor and changing the amount of the catalyst modifier fed to the reactor by at least 5 ppm (based on the weight of copolymer produced).

The melt flow ratio of an ethylene polymer or copolymer may be altered by changing the amount of a catalyst modifier included in the polymerization catalyst by at least 0.5 wt %, (based on the weight of the catalyst, the support, and catalyst modifier), the catalyst modifier having the formula $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1; and polymerizing ethylene and optionally an alpha-olefin in the gas phase reactor The melt flow ratio of an ethylene polymer or copolymer may be altered by: introducing into a gas phase reactor during polymerization; i) a Ziegler-Natta type catalyst, ii) an inert support and iii) further including from 0.5 to 10 wt % of a catalyst modifier; feeding from 1 to 100 ppm of a catalyst modifier into the gas phase reactor (based on the weight of the copolymer produced); and polymerizing ethylene and optionally an alpha-olefin in the gas phase reactor; wherein the catalyst modifier has the formula: $R^1R^2_xN((CH_2)_nOH)_y$, where $R^1$ is a hydrocarbyl group having from 5 to 30 carbon atoms, $R^2$ is hydrogen or a hydrocarbyl group having from 1 to 30 carbon atoms, x is 1 or 0, y is 1 when x is 1, y is 2 when x is 0, each n is independently an integer from 1 to 30 when y is 2, and n is an integer from 1 to 30 when y is 1; by changing at least one of the following: a) the amount of the catalyst modifier fed into the gas phase reactor by at least 5 ppm (based on the weight of copolymer produced); b) the amount the catalyst modifier included in the polymerization catalyst by at least 0.5 wt % (based on the weight of i), ii) and iii) of the polymerization catalyst).

EXAMPLES

Catalyst Modifier

Armostat 1800 was purchased from Akzo Nobel. The reagent was dissolved in toluene and the resulting solution was dried over activated molecular sieves for several days before use. Toluene and pentane were purchased as anhydrous grades and were further dried over activated molecular sieves.

Preparation of Comparative-1 Catalyst:

50 g of silica (38 μm average particle size, 316 m$^2$/g surface area, 1.54 mL/g pore volume) which had been dehydrated substantially as described in U.S. Pat. No. 6,140,264, was added to a 500 mL flask in a glove box. To the flask was added approximately 190 mL of pentane. The slurry was stirred and 12.0 g of a 25.3 wt % triethyl aluminum in hexane solution was added over approximately 5 minutes. The mixture was stirred for 1 hour at ambient temperature. 35.5 g of a 19.6 wt % butyl ethyl magnesium in heptane solution which contains ~1.4 wt % triethyl aluminum was added to the slurry over approximately 10 minutes. The mixture was stirred for 2 hours at ambient temperature. The slurry was cooled to maintain a temperature below 20° C. while 11.7 g of dried t-butyl chloride containing <50 ppm water diluted to 35 wt % in pentane was added over about 20 minutes. The mixture was stirred for 2 hours after the addition was completed. 1.5 g of TiCl$_4$ diluted to approximately 10 wt % in pentane was added to the flask at ambient temperature over about 5 minutes and the mixture was stirred further for 2 hours. 5.1 g of tetrahydrofuran (THF) diluted to 25 wt % in pentane was added over 10 minutes, providing a THF:Ti molar ratio of 9:1. The mixture was stirred for 1 hour at room temperature. A 25.8 wt % tri-n-hexyl aluminum (TnHAL) in hexane solution was added over 10 minutes at ambient temperature in an amount that would provide a TnHAL:Ti molar ratio of 3.0-3.5:1. After the addition was completed, the mixture was stirred for 45 minutes. A vacuum was then applied to remove the solvent. The catalyst was further dried by vacuum at 50° C.

Preparation of Inventive Catalyst (Catalyst A)

In a round-bottom flask equipped with an overhead stirrer, 60 g of the Comparative-1 Catalyst prepared above was slurried in 250 mL of dried pentane. While the slurry was being stirred, 8.30 g of an 18.55 wt % Armostat 1800 in toluene solution was added to the slurry to provide 2.5 wt % loading of Armostat 1800 in the finished catalyst. The slurry was stirred for 30 minutes at ambient temperature. The solvents were removed by applying a high dynamic vacuum first at 30° C. to remove pentane, and then at 60° C. to remove toluene. The drying process was completed when 500 mTorr was achieved, resulting in a free flowing powder.

Preparation of Comparative-2 Catalyst

This catalyst was prepared in the same manner as the Comparative Catalyst-1, except that a silica with 40 μm average particle size, 311 m²/g surface area and 1.62 mL/g pore volume was used as the catalyst support.

Preparation of Inventive Catalyst (Catalyst B)

In a round-bottom flask equipped with an overhead stirrer, 60 g of the Comparative-2 Catalyst prepared above was slurried in 250 mL of dried pentane. While the slurry was being stirred, 4.93 g of an 18.55 wt % Armostat 1800 in toluene solution was added to the slurry to provide 1.5 wt % loading of Armostat 1800 in the finished catalyst. The slurry was stirred for 30 minutes at ambient temperature. The solvents were removed by applying a high dynamic vacuum first at 30° C. to remove pentane, and then at 60° C. to remove toluene. The drying process was completed when 500 mTorr was achieved, resulting in a free flowing powder.

Preparation of Inventive Catalyst (Catalyst C)

This catalyst was prepared in the same manner as the Catalyst B, except that the loading of Armostat 1800 in the finished catalyst was 2.5 wt %.

General Polymerization Conditions

Continuous ethylene/1-hexene gas phase copolymerization experiments were conducted in a 56.4 liter technical scale reactor (TSR) in continuous gas phase operation (for an example of a TSR reactor set up see European Patent Application No. 659,773A1). Ethylene polymerizations were run at 88° C., ethylene partial pressure of 800 kilo pascal gauge (kPag) and total operating pressure of 2067 kPag.

Ethylene gas phase composition in the reactor was controlled via closed-loop process control to a value of 38 mole percent. Hexene to ethylene molar flow ratio to the reactor was controlled via closed loop process control to values from 0.065 to 0.086. Hydrogen to ethylene molar flow ratio to the reactor was controlled from 0.029 to 0.037. Nitrogen constituted the remainder of the gas phase mixture. Triethylaluminum (TEAL) was fed to the reactor continuously, as a 4.0 wt % solution in hexane at a rate of approximately 120 parts per million (ppm) with respect to production rate as a co-catalyst and impurity scavenger. The residence time in the reactor is held at 1.5 to 1.8 hour, with a production rate range from 2.3 to 2.8 kg of polyethylene per hour (kg/hr).

Polymer Analysis

Melt index, $I_2$, in g/10 min was determined using a Tinius Olsen Plastomer (Model MP993) in accordance with ASTM D1238 condition F at 190° C. with a 2.16 kilogram weight. High load melt index, 121, in g/10 min was determined in accordance with ASTM D1238 condition E at 190° C. with a 21.6 kilogram weight.

Polymer density was determined in grams per cubic centimeter (g/cc) according to ASTM D1928.

Polymerization Results

The data shown in Table 1 clearly show that the addition of a catalyst modifier to a supported Ziegler-Natta catalyst useful in gas phase polymerization of ethylene and alpha-olefins has the effect of increasing the melt flow ratio ($I_{21}/I_2$) of the resulting polymer. The increase in MFR is dependent upon the amount of catalyst modifier added to the catalyst. A catalyst with 1.5 wt % Armostat 1800 produced a polymer with an MFR that was 4.83% higher than the polymer produced under the same conditions using the same catalyst but without added Armostat 1800. Adding 2.5% Armostat 1800 to the catalyst produced an even higher percentage increase in MFR, ranging from 4.66 to 9.29%. Alteration of the support used appears to have no effect on the ability of a catalyst modifier to increase the MFR of a resin produced with a similar catalyst.

TABLE 1

| Catalyst | Armostat 1800 in Catalyst (wt %) | Density (g/cc) | $I_2$ (g/10 min) | $I_{21}/I_2$ | % change in $I_{21}/I_2$ |
|---|---|---|---|---|---|
| Comparative-1 | None | 0.9158 | 0.73 | 27.9 | |
| A | 2.5 | 0.9228 | 0.52 | 29.2 | 4.66 |
| A | 2.5 | 0.9204 | 0.68 | 29.6 | 6.10 |
| Comparative-2 | None | 0.9214 | 0.63 | 26.9 | |
| B | 1.5 | 0.9218 | 0.56 | 28.2 | 4.83 |
| C | 2.5 | 0.9236 | 0.33 | 28.4 | 5.58 |
| C | 2.5 | 0.9213 | 0.45 | 29.4 | 9.29 |

What is claimed is:

1. A method for altering the melt flow ratio of an ethylene polymer or copolymer, said method comprising:
   i) introducing a polymerization catalyst into a gas phase reactor, said polymerization catalyst comprising:
      a) a Ziegler-Natta catalyst;
      b) an inert support; and
      c) from 0.01 to 5 wt % of a catalyst modifier based on the weight of a), b), and c) of the polymerization catalyst, the catalyst modifier comprising a compound having the formula: $R^1R^2_xN((CH_2)_nOH)_y$ where $R^1$ is a hydrocarbyl group having from 5 to 30 carbon atoms, $R^2$ is hydrogen or a hydrocarbyl group having from 1 to 30 carbon atoms, x is 1 or 0, y is an integer, the sum of x and y is 3 and each n is independently an integer from 1 to 30; and
   ii) polymerizing ethylene and optionally a $C_{3-6}$ alpha olefin to give the ethylene polymer or copolymer;
   wherein the melt flow ratio of said ethylene polymer or copolymer is altered by changing the amount of the catalyst modifier in said polymerization catalyst by at least 0.5 wt % (based on the weight of a), b), and c) of the polymerization catalyst).

2. The method of claim 1 wherein the catalyst modifier comprises at least one compound of the formula: $R^1N((CH_2)_nOH)((CH_2)_mOH)$ where $R^1$ is a hydrocarbyl group having from 5 to 30 carbon atoms, and n and m are integers from 1 to 20.

3. The method of claim 1 wherein the catalyst modifier comprises at least one compound of the formula: $R^1N((CH_2)_xOH)_2$ where $R^1$ is a hydrocarbyl group having from 6 to 30 carbon atoms, and x is independently an integer from 1 to 20.

4. The method of claim 1 wherein the catalyst modifier comprises at least one compound of the formula: $R^1N((CH_2)_xOH)_2$ where $R^1$ is a hydrocarbyl group having from 6 to 30 carbon atoms, and x is 2 or 3.

5. The method of claim 1 wherein the catalyst modifier comprises at least one compound of the formula: $R^1N(CH_2CH_2OH)_2$ where $R^1$ is a hydrocarbyl group having from 8 to 22 carbon atoms.

6. The method of claim 1 wherein the catalyst modifier comprises a compound of the formula: $C_{18}H_{37}N(CH_2CH_2OH)_2$.

7. The method of claim 1 wherein the catalyst modifier comprises compounds of the formulas: $C_{13}H_{27}N(CH_2CH_2OH)_2$ and $C_{15}H_{31}N(CH_2CH_2OH)_2$.

8. The method of claim 1 wherein the catalyst modifier comprises a mixture of compounds of the formula: $R^1N(CH_2CH_2OH)_2$ where $R^1$ is a hydrocarbyl group having from 8 to 18 carbon atoms.

9. The method of claim 1 wherein the polymerization catalyst is produced in a process wherein the catalyst modifier is added at any step during production of the Ziegler-Natta type catalyst combined with the inert support.

10. The method of claim 1 wherein the amount of catalyst modifier added to the polymerization catalyst is at least 0.75 wt % based on the weight of a), b), and c) of the polymerization catalyst.

11. The method of claim 1 wherein the amount of catalyst modifier added to the polymerization catalyst is at least 1.0 wt % based on the weight of a), b), and c) of the polymerization catalyst.

\* \* \* \* \*